C. L. BARKER.
FLOATING BEARING.
APPLICATION FILED AUG. 3, 1914.
1,124,256.
Patented Jan. 12, 1915.
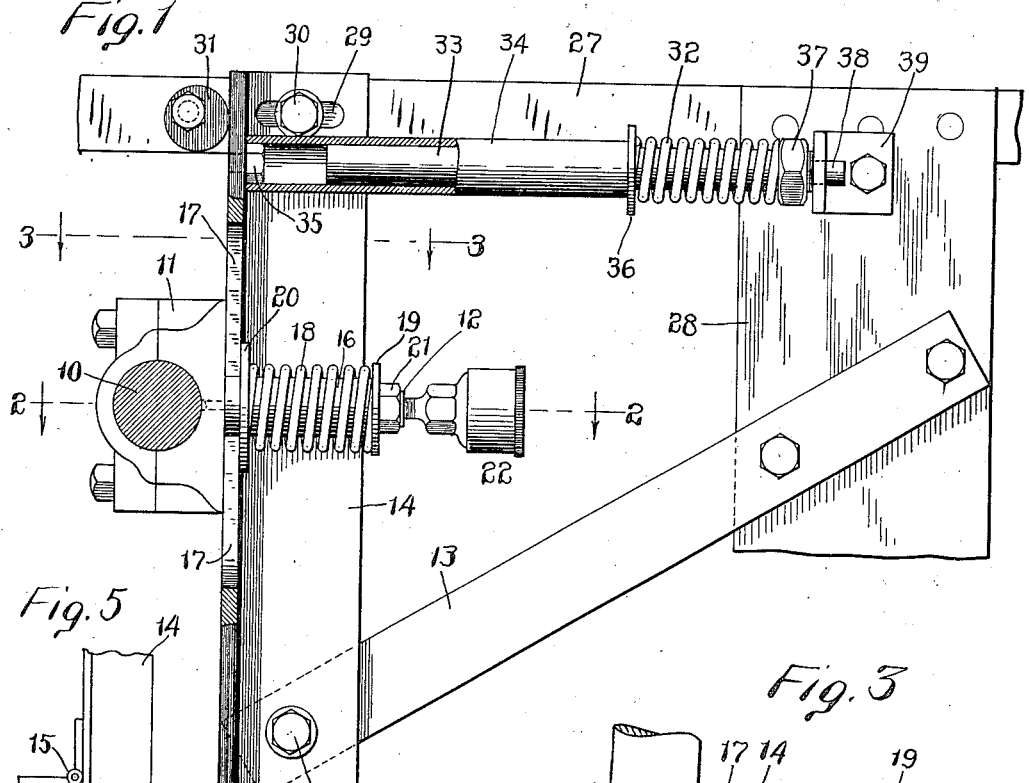
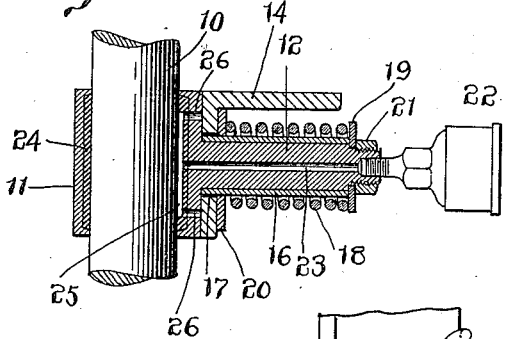
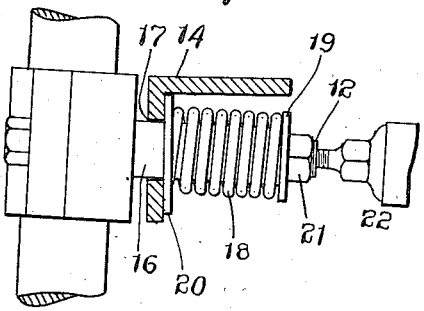
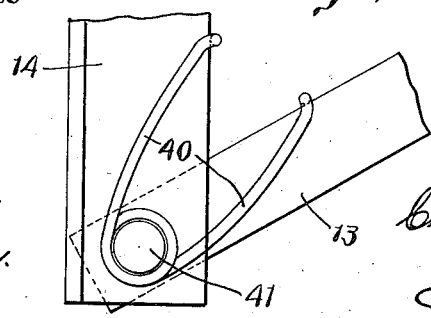
WITNESSES:
H. W. Meade
E. M. Culver
INVENTOR
Charles L. Barker
BY
A. M. Wooster
ATTORNEY

UNITED STATES PATENT OFFICE.

CHARLES L. BARKER, OF NORWALK, CONNECTICUT.

FLOATING BEARING.

1,124,256.    Specification of Letters Patent.    Patented Jan. 12, 1915.

Application filed August 3, 1914. Serial No. 854,645.

*To all whom it may concern:*

Be it known that I, CHARLES L. BARKER, a citizen of the United States, residing at Norwalk, county of Fairfield, State of Connecticut, have invented an Improvement in Floating Bearings, of which the following is a specification.

This invention has for its object to prevent whipping movement, so called, of a rotating shaft. This I accomplish by means of a floating bearing so constructed as to resist unevenly whipping movement of the shaft in different directions, while at the same time it will permit movement of the shaft in any direction except in the circumference of a circle of greater diameter than its own.

It is of course well understood that in the case of line shafting and the driving shafts of marine engines and motor cars, there is always more or less, and in many instances a great tendency of the shaft to whip, that is, to swing around in a circle of greater diameter than its own. My present invention enables me to reduce this whipping movement of an automobile shaft, for example, to the minimum, by providing unequal resistance to its movement in different directions, thereby rendering it impossible for it to swing in a circle.

In the accompanying drawing forming a part of this specification, Figure 1 is a view partly in elevation and partly in section illustrating an application of the principle of my novel invention; Fig. 2 a section on the line 2—2 in Fig. 1, looking in the direction of the arrows; Fig. 3 a section on the line 3—3 in Fig. 1, looking in the direction of the arrows, showing a changed position of the parts; Fig. 4 a detail view illustrating the use of a different style of spring, and Fig. 5 is a detail view illustrating another form of pivotal connection for the swinging arm.

10 denotes a shaft, for example the driving shaft of a motor car, 11 a bearing therefor which is provided with a shank 12, and 13 a fixed part that may be anything that is relatively fixed, as for example a fixed part of an automobile chassis, or of a boat, or a bracket or arm rigidly secured to any fixed part, as indicated in the drawing.

14 denotes a swinging arm, in the present instance an angle arm, which is pivotally secured to the fixed part, for example as at 15 in either figures 1 or 5. So far as the principle of the invention is concerned, any form of bearing may be used for the shaft.

The shank is shown as provided with a sleeve 16, preferably of steel and free to rotate thereon, although the sleeve is not an essential feature of the invention. The shank passes through a slot 17 in the swinging arm and carries a spring 18, the ends of which bear against the swinging arm and against a suitable bearing point, for example a washer 19 at the outer end of the shank.

A washer 20 is shown as interposed between the inner end of the spring and the swinging arm. Washer 19 is retained in place by a nut 21 which engages a reduced threaded end of the shank. In the present instance I have shown the shank as provided with a grease cup 22 and a central hole 23 through which grease is supplied to the bearing.

I have shown the shaft as journaled in a bearing sleeve 24 having a groove 25 which communicates with the hole in the shank, the bearing and sleeve being provided with alined holes 26 through which oil may pass from groove 25 to the bearing surfaces between bearing 11 and the swinging arm, on opposite sides of slot 17 in the arm.

It is of course necessary that means should be provided for limiting the movement of swinging arm 14. In the present instance I have shown a bar 27 and a plate 28 rigidly secured to the bar, to which fixed part 13 is rigidly secured. It should be understood, however, that these parts are merely shown for convenience in illustration and are wholly unimportant so far as the principle of the invention is concerned. The swinging arm is shown as resting against the bar and is provided with a slot 29 through which a bolt 30 passes and engages the bar. The engagement of the bolt with the left end of the slot will limit the swing of the arm toward the right.

As a means of adjusting the swinging arm to the normal position of the shaft and bearing, I provide a suitable adjustable stop on the bar. In the present instance I have shown an eccentric 31 pivoted to the bar against which the swinging arm is held by a spring 32. This spring is shown as carried by a rod 33 over which a tube 34, which bears against the swinging arm, is adapted to slide. The tube is retained in place by passing the end thereof over the head 35 of a screw which engages the swinging arm. At the other end of the tube is a washer 36 against which the spring bears, the other end of the spring bearing against a nut 37 which engages a thread on the rod. This end of the rod is reduced as at 38 and passes through a hole in a bracket 29 secured to plate 28 to detachably retain the parts in place.

As an alternative means for yieldingly retaining the swinging arm in its normal position, the tube, rod, spring and yoke just described may be dispensed with and in lieu thereof a U-shaped spring 40 may be used, as in Fig. 4. In this form the spring is provided with one or more coils through which the pivot pin 41 of the swinging arm passes, and the arms of the spring bear respectively against the fixed part and the swinging arm.

The operation is as follows: The stop is of course adjusted when the shaft is stationary and in its normal position. Spring 18 is acting to retain the swinging arm in engagement with the bearing. When the parts are in this position, the stop is placed in engagement with the swinging arm, as in Fig. 1, and locked there by turning in the pivot bolt. Vertical movement of the shaft and bearing is provided for by the sliding of the shank in slot 17 in the swinging arm. Lateral movement of the shaft and bearing toward the left, as seen in Fig. 1, is resisted by spring 18, as indicated in Fig. 3, in which the spring is shown as compressed and the shaft and bearing as moved away from the swinging arm, which is retained in place by the stop, the action of the spring being to return the parts to the position shown in Fig. 1. Lateral movement of the shaft and bearing in the opposite direction, that is toward the right will carry the swinging arm also and will be resisted by spring 32, or in the form illustrated in Fig. 4, by U-shaped spring 40, the action of either spring being to return the parts to the position shown in Fig. 1. It will be noted that the action of my novel invention is to resist all except rotary motion of the shaft, but to resist movement in different directions unequally, so that circular swinging of the shaft, i. e. whipping, is rendered impossible. Without regard to the special strength of the springs, variability of resistance to the swinging movement of the shaft is insured by changes in position of the shaft relatively to the pivotal point of the swinging arm, it being obvious that when the shaft moves away from the pivotal point of the swinging arm, the leverage exerted by the shaft on the swinging arm and against the power of one or the other of the springs will be increased and the relative resistance reduced and when the shaft moves toward the pivotal point of the swinging arm, the leverage will be reduced and the relative resistance increased.

Having thus described my invention, I claim:

1. The combination with a shaft, a bearing therefor having a shank, and a pivoted swinging arm having a slot in which the shank may slide, of means for yieldingly resisting movement of the bearing away from the arm and means for yieldingly resisting movement of the bearing and arm in the opposite direction, movement of the shaft toward or from the pivotal point of the swinging arm acting to relatively increase or diminish the resistance so that whipping of the shaft is prevented.

2. In combination, a bearing having a shank, a swinging arm having a slot in which the shank may slide, means for yieldingly resisting movement of the bearing away from the arm and means for yieldingly resisting movement of the bearing and arm in the opposite direction, substantially as described, for the purpose specified.

3. In combination, a bearing having a shank, a swinging arm having a slot in which the shank may slide, a stop for normally determining the position of the arm relatively to the bearing, means for yieldingly resisting movement of the bearing away from the arm and means for yieldingly resisting movement of the bearing and arm in the opposite direction.

4. In combination, a bearing having a shank, a swinging arm having a slot in which the shank may slide, a spring carried by the shank and acting to resist movement of the bearing away from the arm and another spring for resisting movement of the bearing and arm in the opposite direction.

5. The combination with a shaft and a bearing therefor having a shank with a central hole, of a swinging arm having a slot in which the shank may slide, a grease cup carried by the shank for lubricating the shaft and the bearing, and springs acting to resist movement of the bearing away from the arm and movement of the bearing and arm in the opposite direction.

6. A structure of the character described, comprising a bearing having a shank, a swinging arm having a slot in which the shank may slide, and springs acting to resist movement of the bearing away from the arm and movement of the bearing and arm in the opposite direction.

7. A structure of the character described, comprising a bearing having a shank, a swinging arm having a slot in which the shank may slide, a spring acting to resist movement of the bearing away from the arm, another spring acting to resist movement of the bearing and arm in the opposite direction, and a stop engaged by the arm when the bearing is in its normal position.

8. The combination with a fixed part, a bearing having a shank, and an arm pivoted to the fixed part and having a slot in which the shank may slide, of a stop normally engaged by the swinging arm, means for resisting movement of the bearing away from the arm, and means for resisting movement of the bearing and arm in the opposite direction.

9. The combination with a fixed part, a bearing having a shank, and an arm pivoted to the fixed part and having a slot in which the shank may slide, of a spring carried by the shank and acting to resist movement of the bearing away from the arm, a stop normally engaged by the arm, a tube bearing against the arm, a fixed rod over which the tube may slide and a spring acting against the rod and the tube to resist movement of the arm away from the stop when pressure is exerted by the bearing on the arm.

10. The combination with a fixed part, a bearing having a shank, and an arm pivoted to the fixed part and having a slot on which the shank may slide, and another slot at its outer end, of a spring acting to resist movement of the bearing away from the arm, a stop normally engaged by the arm, a bolt in the slot at the outer end of the arm to limit movement of the arm away from the stop and a second spring acting to resist movement of the arm away from the stop when pressure is exerted by the bearing on the arm.

In testimony whereof I affix my signature in presence of two witnesses.

CHARLES L. BARKER.

Witnesses:
  H. W. MEADE,
  E. M. CULVER.